(12) United States Patent
Yagi et al.

(10) Patent No.: US 10,330,403 B2
(45) Date of Patent: Jun. 25, 2019

(54) HEATING AND COOLING SYSTEM

(71) Applicant: FURUKAWA ELECTRIC CO., LTD., Tokyo (JP)

(72) Inventors: Masashi Yagi, Tokyo (JP); Hiroyuki Fukushima, Tokyo (JP); Jun Teng, Tokyo (JP); Tomohiro Takagi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/669,369

(22) Filed: Aug. 4, 2017

(65) Prior Publication Data

US 2017/0336154 A1    Nov. 23, 2017

Related U.S. Application Data

(63) Continuation of application No. PCT/JP2016/052749, filed on Jan. 29, 2016.

(30) Foreign Application Priority Data

Feb. 6, 2015  (JP) .................................. 2015-022403

(51) Int. Cl.
   *F28F 13/14*     (2006.01)
   *F16L 59/065*    (2006.01)
   (Continued)

(52) U.S. Cl.
   CPC ................ *F28F 13/14* (2013.01); *F16L 9/19* (2013.01); *F16L 59/065* (2013.01); *F16L 59/14* (2013.01);
   (Continued)

(58) Field of Classification Search
   CPC .. F28F 13/14; F28F 1/003; F28F 27/00; F16L 9/19; F16L 9/18; F16L 9/12; F16L 59/065; F16L 59/075; F16L 59/14
   See application file for complete search history.

(56) References Cited

U.S. PATENT DOCUMENTS 3,270,769 A * 9/1966 Kaiser ................... F16L 59/065
                                                       137/375
3,344,803 A * 10/1967 Olivier .................... F16L 29/02
                                                       137/375

(Continued)

FOREIGN PATENT DOCUMENTS

| CN | 101813230 A | 8/2010 |
| JP | 2001-108319 | 4/2001 |

(Continued)

OTHER PUBLICATIONS

International Search Report dated Apr. 26, 2016 in PCT/JP2016/052749, filed on Jan. 29, 2016 (with English translation).

(Continued)

*Primary Examiner* — Tho V Duong
(74) *Attorney, Agent, or Firm* — Oblon, McClelland, Maier & Neustadt, L.L.P.

(57) ABSTRACT

In order to obtain a heating and cooling system capable of localized cooling or heating a given area, a heating and cooling system includes: a supply section configured to supply a heating medium; and a double pipe unit including: an inner pipe, connected to the supply section, through which the heating medium flows, and an outer pipe disposed at an outer peripheral side of the inner pipe, the outer pipe including a space between the inner pipe and the outer pipe, the space being maintained at a vacuum, portions in which a degree of vacuum of the space is different, or in which the degree of vacuum of the space is adjustable.

9 Claims, 6 Drawing Sheets

(51) Int. Cl.
F16L 9/19 (2006.01)
F28F 1/00 (2006.01)
F28F 27/00 (2006.01)
F16L 59/14 (2006.01)

(52) U.S. Cl.
CPC .............. *F28F 1/003* (2013.01); *F28F 27/00* (2013.01); *F28F 2270/00* (2013.01)

(56) References Cited

U.S. PATENT DOCUMENTS

| 4,546,798 A | * | 10/1985 | Porta | F16L 59/065 |
| | | | | 138/149 |
| 5,408,832 A | * | 4/1995 | Boffito | F16L 59/065 |
| | | | | 428/69 |
| 2010/0038898 A1 | * | 2/2010 | Ollier | E21B 36/003 |
| | | | | 285/47 |
| 2011/0233923 A1 | * | 9/2011 | Kouketsu | F16L 39/005 |
| | | | | 285/123.3 |
| 2013/0105116 A1 | | 5/2013 | Campbell et al. | |

FOREIGN PATENT DOCUMENTS

| JP | 2005-281198 | 10/2005 |
| JP | 2010-254202 | 11/2010 |
| JP | 2011-207321 | 10/2011 |
| JP | 2013-139949 | 7/2013 |
| JP | 2015-501489 | 1/2015 |

OTHER PUBLICATIONS

Written Opinion dated Apr. 26, 2016 in PCT/JP2016/052749, filed on Jan. 29, 2016.

Notice of Reasons for Rejection dated Jul. 28, 2016, in Japanese Application No. 2016-533748 (5 pages, with English-language translation).

Combined Chinese Office Action and Search Report dated Nov. 2, 2018 in Chinese Patent Application No. 201680008933.2 (with partial English translation and English translation of Category of Cited Documents), 10 pages.

* cited by examiner

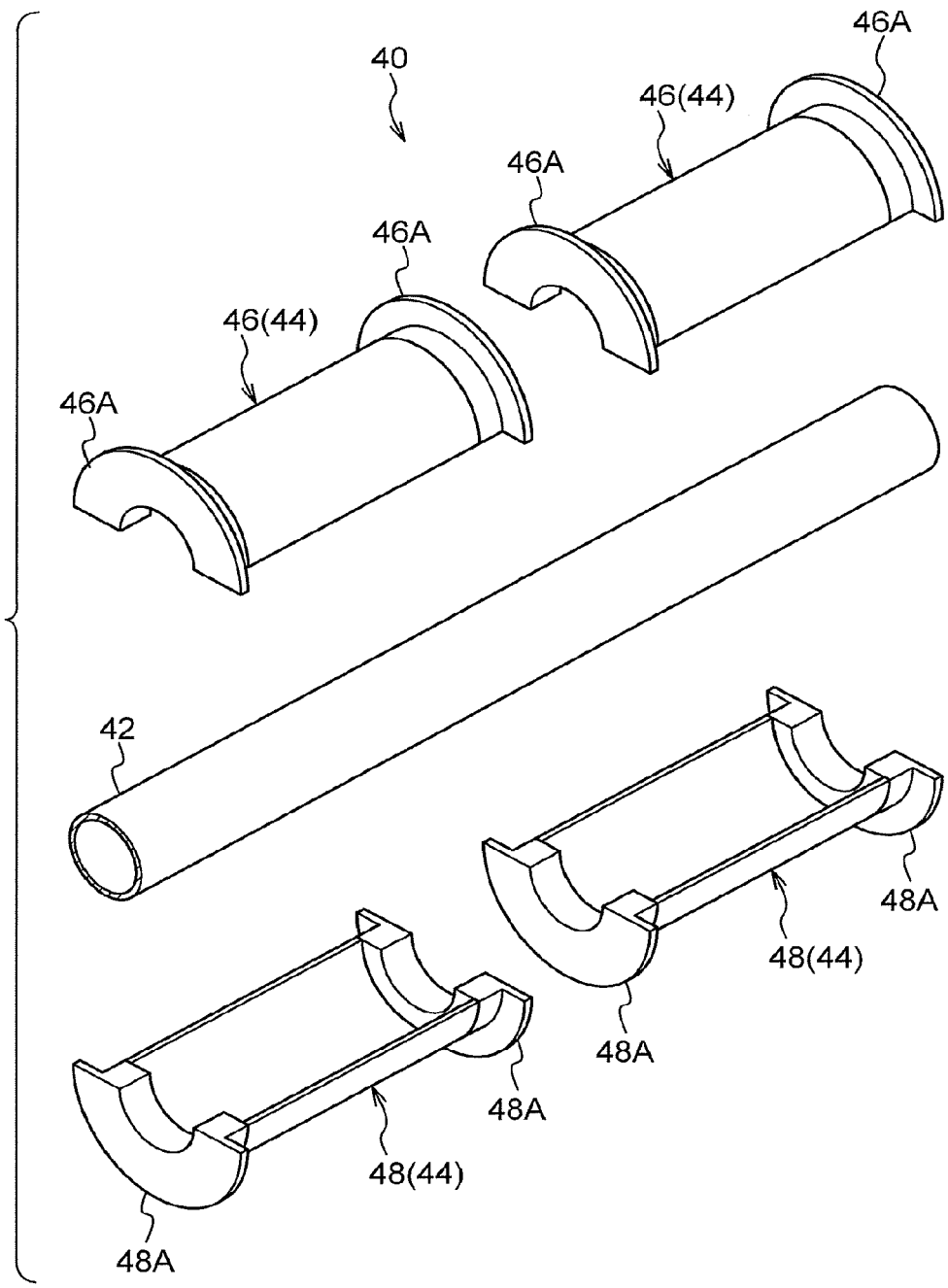

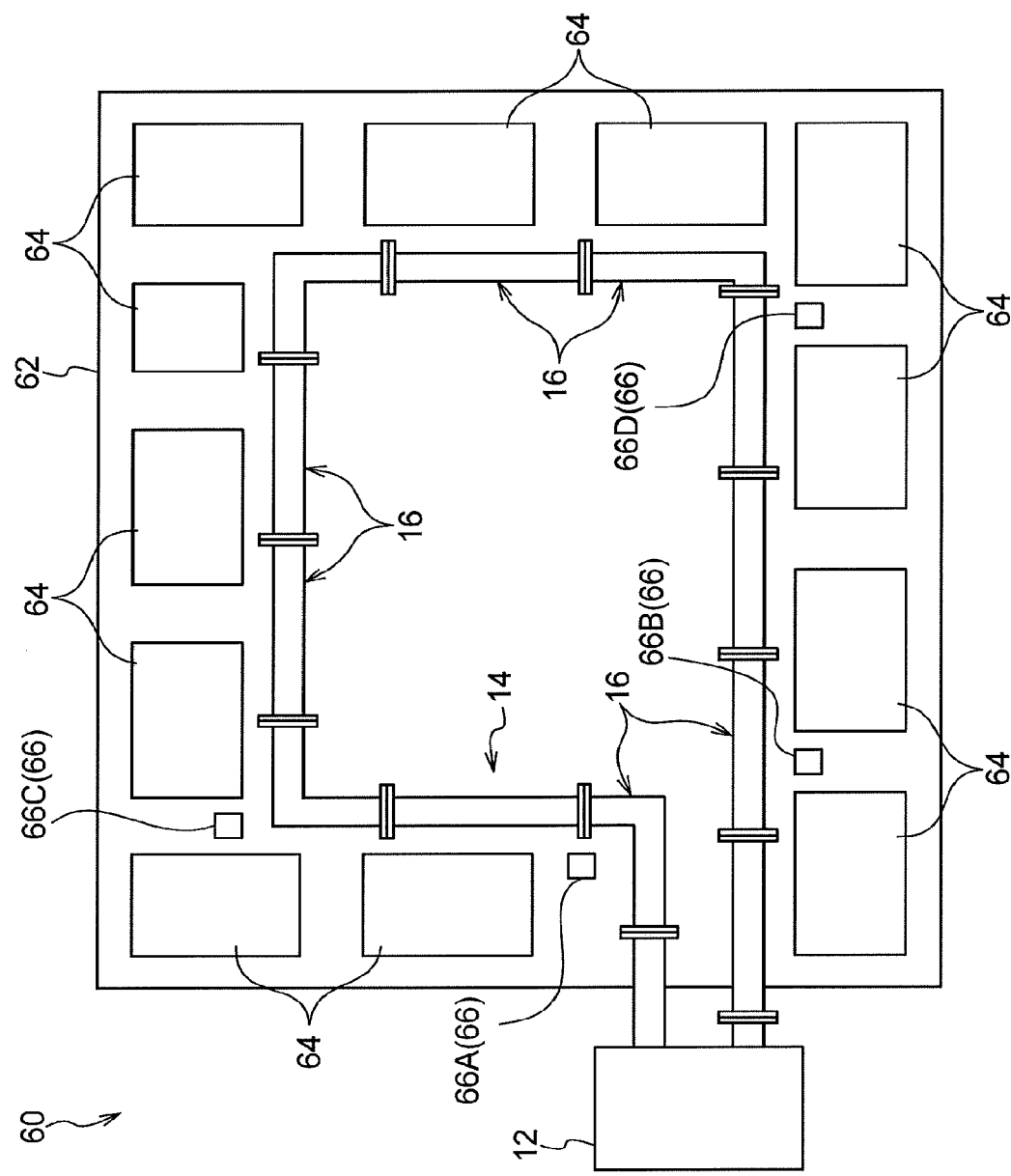

HEATING AND COOLING SYSTEM

CROSS-REFERENCE TO RELATED APPLICATIONS

This application is a continuation application of International Application No. PCT/JP2016/052749, filed on Jan. 29, 2016, which is incorporated herein by reference in its entirety. Further, this application claims priority from Japanese Patent Application No. 2015-022403, filed on Feb. 6, 2015, the disclosure of which is incorporated by reference herein in its entireties.

BACKGROUND

Technical Field

The present invention relates to a heating and cooling system.

Related Art

As a heating and cooling system to cool a cooling target and to heat a heating target, Japanese Patent Application Laid-Open (JP-A) No. 2013-139949 discloses a heating and cooling system that cools or heats a floor panel by delivering a heating medium such as cooling water or heating water generated by a heat exchanger (supply section) through underfloor cooling-and-heating water pipes.

However, in methods that employ cooling-and-heating water pipes, the temperature of the heating medium changes as it passes from the heating medium supply section to reach the cooling target or heating target. Due thereto, Localized cooling or heating of a given area is difficult.

SUMMARY

In consideration of the above circumstances, an object of the present invention is to obtain a heating and cooling system that may enable localized cooling or heating of a given area.

A heating and cooling system of a first aspect includes: a supply section configured to supply a heating medium; and a double pipe unit including: an inner pipe, connected to the supply section, through which the heating medium flows, and an outer pipe disposed at an outer peripheral side of the inner pipe, the outer pipe including a space between the inner pipe and the outer pipe, the space being maintained at a vacuum, portions in which a degree of vacuum of the space is different, or in which the degree of vacuum of the space is adjustable.

In the heating and cooling system of the first aspect, the double pipe unit is connected to the supply section that supplies a heating medium. The double pipe unit includes the inner pipe and the outer pipe, and is configured such that the heating medium is delivered to the inner pipe. The space between the inner pipe and the outer pipe is maintained at a vacuum. Thus, effective thermal insulation is achieved between the inner pipe and the outer pipe, and changes in temperature of the heating medium may be suppressed.

Further, in cases in which a given area between the supply section and a cooling target or a heating target is to be cooled or heated, the thermal insulation effect of the double pipe unit can be locally changed by making the degree of vacuum in the space between the inner pipe and the outer pipe of the double pipe unit positioned at this area (a heat exchange section) a different degree of vacuum. Thus, heat exchange with the heating medium is promoted at this area, enabling localized cooling or heating of the given area to be performed.

A second aspect of the heating and cooling system, in the first aspect, the double pipe unit is configured by coupling together a plurality of double pipes in which the space between the inner pipe and the outer pipe is sealed; and a degree of vacuum of the space in a double pipe, among the plurality of double pipes, that is positioned at a heat exchange section where heat exchange is performed, is lower than the degree of vacuum of the space in other double pipes.

In the heating and cooling system according to the second aspect of the present invention, the degrees of freedom of design may be increased in comparison to configurations in which a single double pipe is connected to the supply section. Namely, even in cases in which the position of the supply section or the heat exchange section is changed, a heating and cooling system may be constructed merely by removing or adding some of the double pipes.

A third aspect of the heating and cooling system, in the first aspect, the double pipe unit includes the inner pipe and a plurality of outer pipes that are coupled together in an axial direction, each of the outer pipes being shorter than the inner pipe in the axial direction, and spaces between adjacent outer pipes being partitioned; and the degree of vacuum of a space at a heat exchange section where heat exchange is performed is lower than the degree of vacuum of the other spaces.

In the heating and cooling system of the third aspect, the number of connection portions between inner pipes may be reduced due to forming the inner pipe longer than the outer pipe, enabling the heating medium to be suppressed from leaking.

A fourth aspect of the heating and cooling system, in the second or the third aspects, the degree of vacuum of the space is maintained at a degree of vacuum of a low vacuum, a medium vacuum, or a high vacuum.

In the heating and cooling system of the fourth aspect, the temperature of the heating medium may be changed at a given area merely by changing over three types of double pipes having different degrees of vacuum. For example, at a given area, by changing over a double pipe maintained at a high vacuum for a double pipe maintained at a low vacuum, heat exchange with the heating medium is promoted, enabling the temperature of the heating medium to be changed. Note that "low vacuum", "medium vacuum", and "high vacuum" indicate pressure regions as defined by JIS. Namely, "low vacuum" is a pressure region of 100 PA or greater, "medium vacuum" is a pressure region from 100 to 0.1 PA, and "high vacuum" is a pressure region from 0.1 to $1 \times 10^{-5}$ PA.

A fifth aspect of the heating and cooling system, in any aspect from the first aspect to the fourth aspect, the degree of vacuum of the space can be changed by using at least one of an air inlet valve or a vacuum pump.

In the heating and cooling system of the fifth aspect, air may be introduced into the space between the inner pipe and the outer pipe by opening the air inlet valve, and the degree of vacuum lowered. Further, gas in the space between the inner pipe and the outer pipe may be discharged and the degree of vacuum raised by actuating the vacuum pump. This enables the degree of vacuum in the space between the inner pipe and the outer pipe to be changed.

A sixth aspect of the heating and cooling system, in the fifth aspect, further includes: an internal thermometer that measures a temperature of the heating medium; and a controller electrically connected to the internal thermometer, wherein the controller adjusts the degree of vacuum of the space by controlling the air inlet valve or the vacuum pump according to the temperature of the heating medium measured by the internal thermometer.

In the heating and cooling system of the sixth aspect, the degree of vacuum in the space between the inner pipe and the outer pipe may be adjusted according to the temperature measured by the internal thermometer, enabling the temperature of the heating medium flowing at a given area to be made a predetermined temperature. For example, in a case in which the heating medium is a coolant, and in a case in which it is desired to raise the temperature of the coolant (the heating medium) flowing at a given area, the controller opens the air inlet valve and introduces air into the space between the inner pipe and the outer pipe. Thereby, the degree of vacuum of this space is lowered, promoting heat exchange with the heating medium, and enabling the temperature of the heating medium to approach the predetermined temperature. In contrast thereto, in a case in which it is desired to lower the temperature of the coolant (the heating medium) flowing at a given area, the controller actuates the vacuum pump and discharges gas inside the space. Thereby, the degree of vacuum of this space is raised, suppressing heat exchange with the heating medium, and enabling the temperature of the heating medium to approach the predetermined temperature. This thereby enables the temperature of the heating medium flowing at the given area to be changed without changing the supply temperature of the heating medium.

A seventh aspect of the heating and cooling system, in the fifth aspect, further includes: an external thermometer that measures a temperature of surroundings of the double pipe unit; and a controller electrically connected to the external thermometer, wherein the controller adjusts the degree of vacuum of the space by controlling the air inlet valve or the vacuum pump according to the temperature of the surroundings of the double pipe unit measured by the external thermometer.

In the heating and cooling system of the seventh aspect, similarly to the sixth aspect, the temperature of the heating medium flowing at a given area may be changed without changing the supply temperature of the heating medium.

An eighth aspect of the heating and cooling system, in the second aspect or the third aspect, a portion of the double pipe unit at a position of the heat exchange section is configured only by the inner pipe.

In the heating and cooling system of the eighth aspect, heat exchange may be more promoted at the portion configured solely by the inner pipe than at other portions.

A ninth aspect of the heating and cooling system, in the second aspect or the third aspect, a portion of the double pipe unit at a position of the heat exchange section is configured only by the inner pipe covered by a thermal insulator.

In the heating and cooling system of the ninth aspect, the thermal insulation effect may be adjusted by changing the amount or type of the thermal insulator.

A tenth aspect of the heating and cooling system, in the second aspect, further includes a single pipe that couples adjacent double pipes together, wherein the single pipe is positioned at a vicinity of the heat exchange section.

In the heating and cooling system of a tenth aspect, similarly to the eighth aspect, heat exchange may be more promoted at the portion configured by the single pipe than at other portions.

As explained above, a heating and cooling system according to the present invention may enable localized cooling or heating of a given area to be performed.

BRIEF DESCRIPTION OF DRAWINGS

FIG. 5 is a perspective view illustrating a modified example of a heating and cooling system according to the first exemplary embodiment of the present invention.

FIG. 6 is a schematic diagram illustrating an overall configuration of a heating and cooling system according to a third exemplary embodiment of the present invention.

DESCRIPTION

First Exemplary Embodiment

Figure 1:
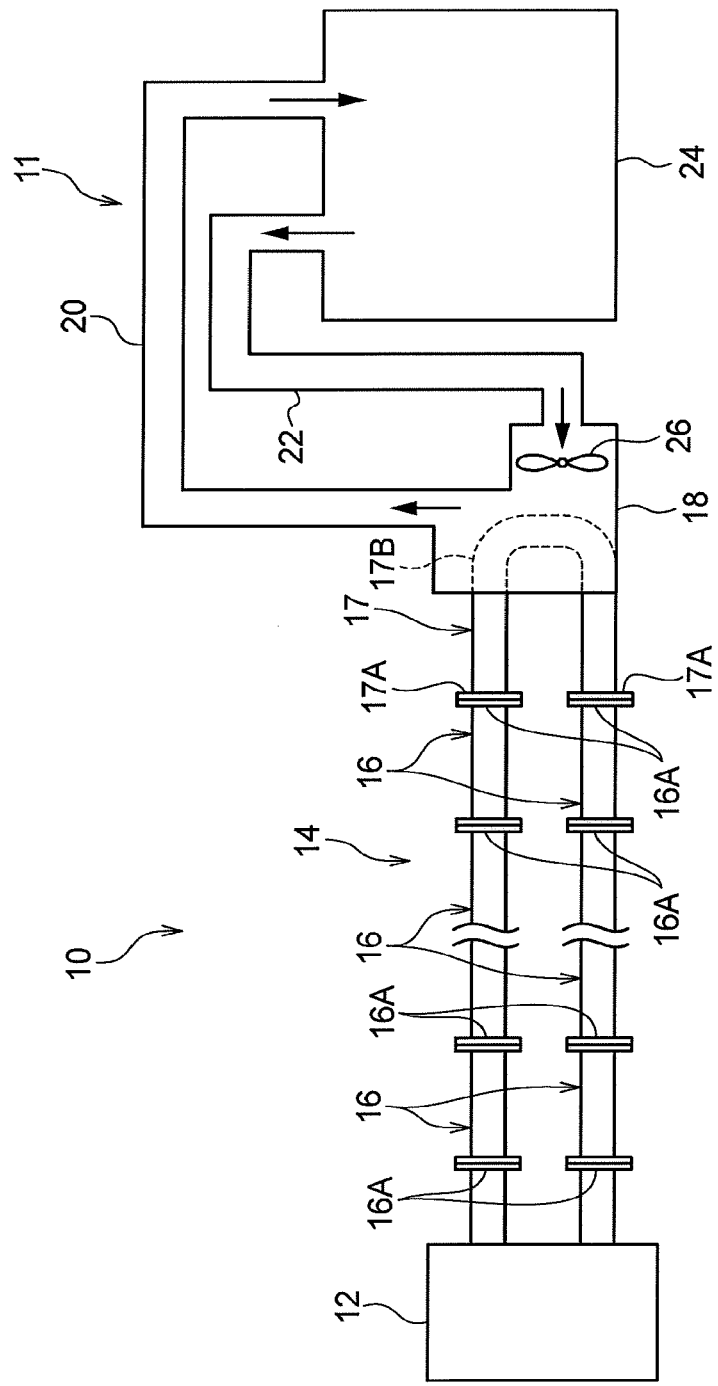
FIG. 1 is a schematic diagram schematically illustrating an overall configuration of a heating and cooling system according to a first exemplary embodiment of the present invention.
Figure 2:
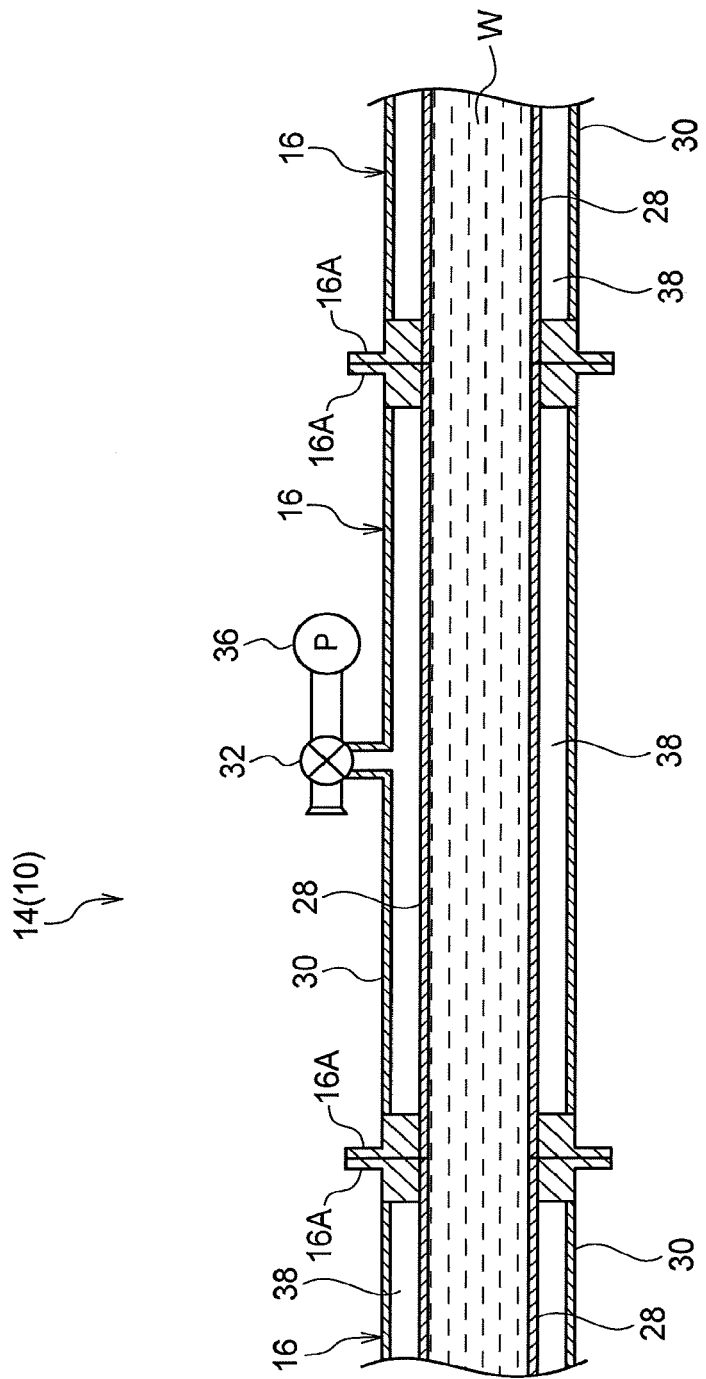
FIG. 2 is a cross-sectional view illustrating a cross-section of a double pipe configuring a heating and cooling system according to the first exemplary embodiment of the present invention.
Figure 3:
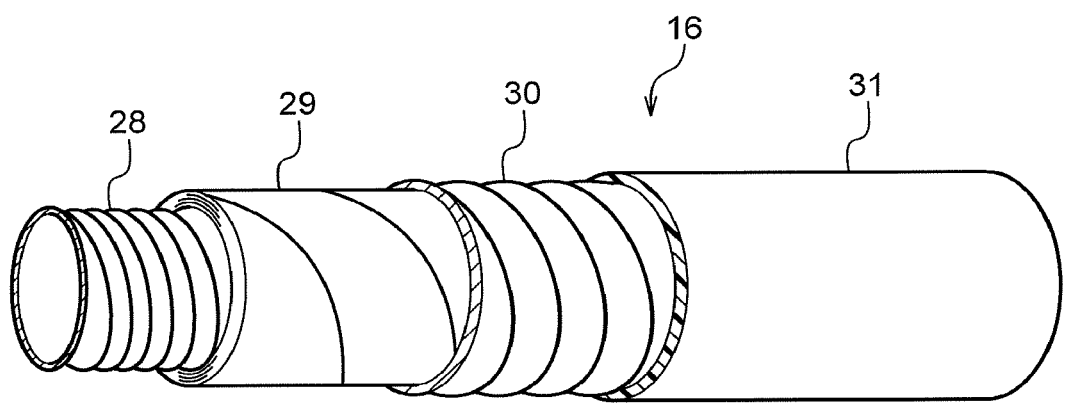
FIG. 3 is a partially cutaway perspective view illustrating a structure of a double pipe configuring a heating and cooling system according to the first exemplary embodiment of the present invention.

Description follows regarding a first exemplary embodiment of a heating and cooling system according to the present invention, with reference to FIG. 1 to FIG. 3. Note that as an example, in the present exemplary embodiment, description follows of an air-conditioning system to cool indoor air. However, the present invention is not limited thereto. For example, the heating and cooling system according to the present invention may be employed in a heating system to heat indoor air. Further, the cooling target and the heating target are not limited to air, and application may be widely made, such as to floor panels and heat sources.

Overall Configuration of Heating and Cooling System

As illustrated in FIG. 1, a heating and cooling system 10 according to the present exemplary embodiment includes a heating plant 12 serving as a supply section, a double pipe unit 14 configured by plural double pipes 16 coupled together.

The heating plant 12 is a unit that cools cooling water serving as a heating medium to a predetermined temperature and supplies the cooling water to the double pipe unit 14. The heating plant 12 includes a pump, not illustrated in the drawings, for delivering the cooling water. The heating plant 12 also includes a refrigerator, not illustrated in the drawings, and by flowing the cooling water through the interior of the refrigerator, the heating plant 12 cools the cooling water to a predetermined temperature.

Note that, since the present exemplary embodiment is an embodiment in which the present invention is applied to an air-conditioning system to cool air, cooling water is cooled in the heating plant 12. However, there is not limitation thereto. For example, in cases in which the present invention is applied to a heating system, heating water may be employed as the heating medium, and a heater may be provided in the heating plant 12 to heat the heating water.

Further, as a heating medium, an extremely low temperature heating medium such as liquid nitrogen may be employed, or a heating medium having a high boiling point such as oil may be employed.

The double pipe unit 14 is coupled together by fastening flanges 16A provided at both ends of plural of the double pipes 16 to each other. In the present exemplary embodiment, the double pipes 16 are installed such that cooling water can be circulated between the heating plant 12 and a facility 11. More specifically, a double pipe 17 connected to a heat exchange chamber 18 of the facility 11 is formed in a substantially U-shape. The double pipes 16 for flowing cooling water from the heating plant 12 to the facility 11 are connected to a flange 17A at one end side of the double pipe 17, and the double pipes 16 for returning cooling water that has passed through the facility 11 to the heating plant 12 are connected to a flange 17A at the other end side of the double pipe 17. The portion of the double pipe 17 passing through the interior of the facility 11 does not have a double pipe structure, and is configured by an ordinary pipe 17B. The double pipes 16 will be described in detail later and, for example, double pipes 16 of 100 m length are employed in the present exemplary embodiment.

The double pipe unit 14 is connected to the heat exchange chamber 18 serving as a heat exchange section of the facility 11. The facility 11 is principally configured including the heat exchange chamber 18 and a room 24. Examples of the room 24 include a server room or office in which the room temperature is controlled. A room used for another purpose may also be employed.

An infeed side pipe 20 to feed a cooling airflow from the heat exchange chamber 18 into the room 24, and a discharge side pipe 22 to discharge air warmed by the room 24 to the heat exchange chamber 18, are connected between the heat exchange chamber 18 and the room 24. A fan 26 is provided in the heat exchange chamber 18, and is configured such that air can be circulated between the heat exchange chamber 18 and the room 24 using the fan 26. Here, the ordinary pipe 17B, in which the cooling water flows, passes through the interior of the heat exchange chamber 18, and heat exchange is performed between this cooling water and the air inside the heat exchange chamber 18. More specifically, the air warmed by the room 24 is discharged to the heat exchange chamber 18 through the discharge side pipe 22. This air is cooled by the cooling water flowing in the double pipe 17, and then the cooled air is introduced into the room 24 through the infeed side pipe 20.

Configuration of Double Pipe Unit

As illustrated in FIG. 2, the double pipes 16 configuring the double pipe unit 14 are configured including an inner pipe 28 through which cooling water flows, and an outer pipe 30 disposed at the outer peripheral side of the inner pipe 28. A space 38 present between the inner pipe 28 and the outer pipe 30 is maintained at a vacuum. The space 38 between the inner pipe 28 and the outer pipe 30 is sealed by the fastening flanges 16A provided at both ends of the double pipes 16.

Further, an air inlet valve 32 is connected to the outer pipe 30. Air is introduced into the space 38 by opening the air inlet valve 32, to lower the degree of vacuum of the space 38. A vacuum pump 36 is connected to the air inlet valve 32. The gas inside the space 38 can be discharged and the degree of vacuum may be raised by actuating the vacuum pump 36. Namely, the degree of vacuum of the space 38 can be adjusted by at least one out of the air inlet valve 32 or the vacuum pump 36. Note that, although in the present exemplary embodiment, all of the double pipes 16 are provided with similar air inlet valves 32 and vacuum pumps 36, the present invention is not limited thereto. For example, a configuration may be adopted in which the air inlet valve 32 and the vacuum pump 36 are provided only to some of the double pipes 16 configuring the double pipe unit 14. Further, a configuration may be adopted in which there is a mixture present of double pipes 16 provided with just the air inlet valve 32, and double pipes 16 provided with just the vacuum pump 36.

Next, description follows regarding details of the structure of the double pipes 16. The double pipes 16 are illustrated only schematically in FIG. 2 and, as illustrated in detail in FIG. 3, the inner pipe 28 configuring the double pipe 16 is covered by a thermal insulation layer 29. Further, in the present exemplary embodiment, the inner pipe 28 is formed by a corrugated pipe. Further, the outer pipe 30 is formed by a larger diameter corrugated pipe than the inner pipe 28 and is disposed at the outer peripheral side of the thermal insulation layer 29. The space 38 between the inner pipe 28 and the outer pipe 30 is maintained at a vacuum. The outer pipe 30 is protected by being covered by a protection layer 31. Note that, although in the present exemplary embodiment, the inner pipe 28 and the outer pipe 30 are formed by corrugated pipes, there is no limitation thereto, and they may be formed by pipes not having corrugated surfaces. Further, although in the present exemplary embodiment, the outer pipe 30 is protected by the protection layer 31, there is no limitation thereto, and a configuration may be adopted in which the protection layer 31 is not provided.

Here, from out of the plural double pipes 16 configuring the double pipe unit 14, the degree of vacuum of the space 38 between the inner pipe 28 and the outer pipe 30 in some of the double pipes 16 is different from the degree of vacuum of the space 38 between the inner pipe 28 and the outer pipe 30 in other double pipes 16. Namely, the double pipe unit 14 include portions where the degree of vacuum is different to that of other portions.

In the heating and cooling system 10 illustrated in FIG. 1 of the present exemplary embodiment, some of the double pipes 16 pass the vicinity of a heat source, not illustrated in the drawings, and the degree of vacuum of the space 38 between the inner pipe 28 and the outer pipe 30 of these double pipes 16 disposed at the vicinity of the heat source is maintained at a degree of vacuum (close to atmospheric pressure) lower than the degree of vacuum of the space 38 between the inner pipe 28 and the outer pipe 30 in the other double pipes 16. More specifically, the degree of vacuum of the space 38 in the double pipes 16 disposed in the vicinity of the heat source is maintained at a low vacuum pressure region as defined by JIS. The degree of vacuum of the space 38 of the other double pipes 16 is maintained at a high vacuum or a medium vacuum pressure region as defined by JIS.

Operation and Advantageous Effects

Next, description follows regarding operation and advantageous effects of the heating and cooling system according to the present exemplary embodiment.

In the heating and cooling system 10 according to the present exemplary embodiment, as illustrated in FIG. 2, the space 38 between the inner pipe 28 and the outer pipe 30 of the double pipes 16 configuring the double pipe unit 14 is maintained at a vacuum. Accordingly, a higher thermal insulation effect may be obtained than cases in which ordinary cooling water pipes and heating water pipes are employed. Namely, due to the thermal insulation of the vacuum layer between the inner pipe 28 and the outer pipe 30, heat exchange between the cooling water flowing in the inner pipe 28 and air may be suppressed effectively. As a result, changes to the temperature of the cooling water may be suppressed, even in a case in which there is a separation distance from the heating plant 12 to the facility 11.

Further, the degree of vacuum of the space 38 between the inner pipe 28 and the outer pipe 30 of the double pipes 16 disposed in the vicinity of the heat source is lower than in the space 38 between the inner pipe 28 and the outer pipe 30 of the other double pipes 16. Heat exchange with the cooling water in the vicinity of the heat source is accordingly promoted, enabling localized cooling of the heat source.

Adopting the above approach enables localized heat exchange to be performed with the heating medium due to making the degree of vacuum at a given portion in the double pipe unit 14 a degree of vacuum lower than the degree of vacuum at other portions. Namely, the present exemplary embodiment may perform localized cooling or heating.

Further, in the present exemplary embodiment, the double pipes 16 are maintained at a degree of vacuum of low vacuum, medium vacuum, or high vacuum. Accordingly, this enables the temperature of the cooling water to be adjusted by simply changing to a double pipe 16 having a different degree of vacuum. For example, in cases in which the space 38 in the double pipe 16 disposed at a given portion is being maintained at a high vacuum, heat exchange with the cooling water may be promoted at this portion by changing the double pipe 16 to a double pipe 16 maintained at medium vacuum. Further, in a case in which deterioration has occurred in the double pipes 16, the double pipes 16 that have deteriorated may be simply replaced, and thus, maintainability may be improved.

Further, in the present exemplary embodiment, as illustrated in FIG. 2, the air inlet valve 32 and the vacuum pump 36 are provided at the outer pipe 30. Thus, the degree of vacuum of the space 38 can be lowered by opening the air inlet valve 32. Further, the degree of vacuum of the space 38 can be raised by actuating the vacuum pump 36. Accordingly, the temperature of the cooling water may be adjusted by changing the degree of vacuum of the space 38 in this manner, without changing the double pipe 16.

Note that in the present exemplary embodiment, the double pipe unit 14 is configured by coupling together the fastening flanges 16A provided at both ends of the plural double pipes 16. However, there is no limitation thereto. For example, a double pipe unit 40 may be configured from an inner pipe 42 and an outer pipe 44, as in a modified example illustrated FIG. 5.

As illustrated in FIG. 5, the double pipe unit 40 of the modified example is configured including the inner pipe 42 and the outer pipe 44. The outer pipe 44 is formed with the same length in the axial direction as the outer pipe 30 of the first exemplary embodiment. However, the inner pipe 42 is formed with a longer length than the inner pipe 28 of the first exemplary embodiment.

The outer pipe 44 is divided into upper and lower sections, and is configured including an upper pipe section 46 and a lower pipe section 48. An upper-side flange 46A is formed at each of the two axial direction ends of the upper pipe section 46, and a lower-side flange 48A is formed at each of the two axial direction ends of the lower pipe section 48. The upper pipe sections 46 and the lower pipe sections 48 are installed so as to sandwich the inner pipe 42 therebetween.

Adjacent outer pipes 44 are coupled together by fastening the respective upper-side flanges 46A to each other and the lower-side flange 48A to each other. The space between the inner pipe 42 and the outer pipe 44 is sealed by installing the outer pipes 44. Thus, a configuration is adopted in which the space between adjacent outer pipes 44 is partitioned, thereby enabling the degree of vacuum of each space to be made different to each other.

In the present modified example, the number of connection portions between the inner pipes 42 may be reduced by forming the inner pipes 42 with a long length, enabling the heating medium to be suppressed from leaking.

Second Exemplary Embodiment

Next, description follows regarding a second exemplary embodiment of a heating and cooling system according to the present invention. Note that the same reference numerals are appended to similar configuration to that of the first exemplary embodiment, and explanation thereof is omitted, if appropriate.

Figure 4:
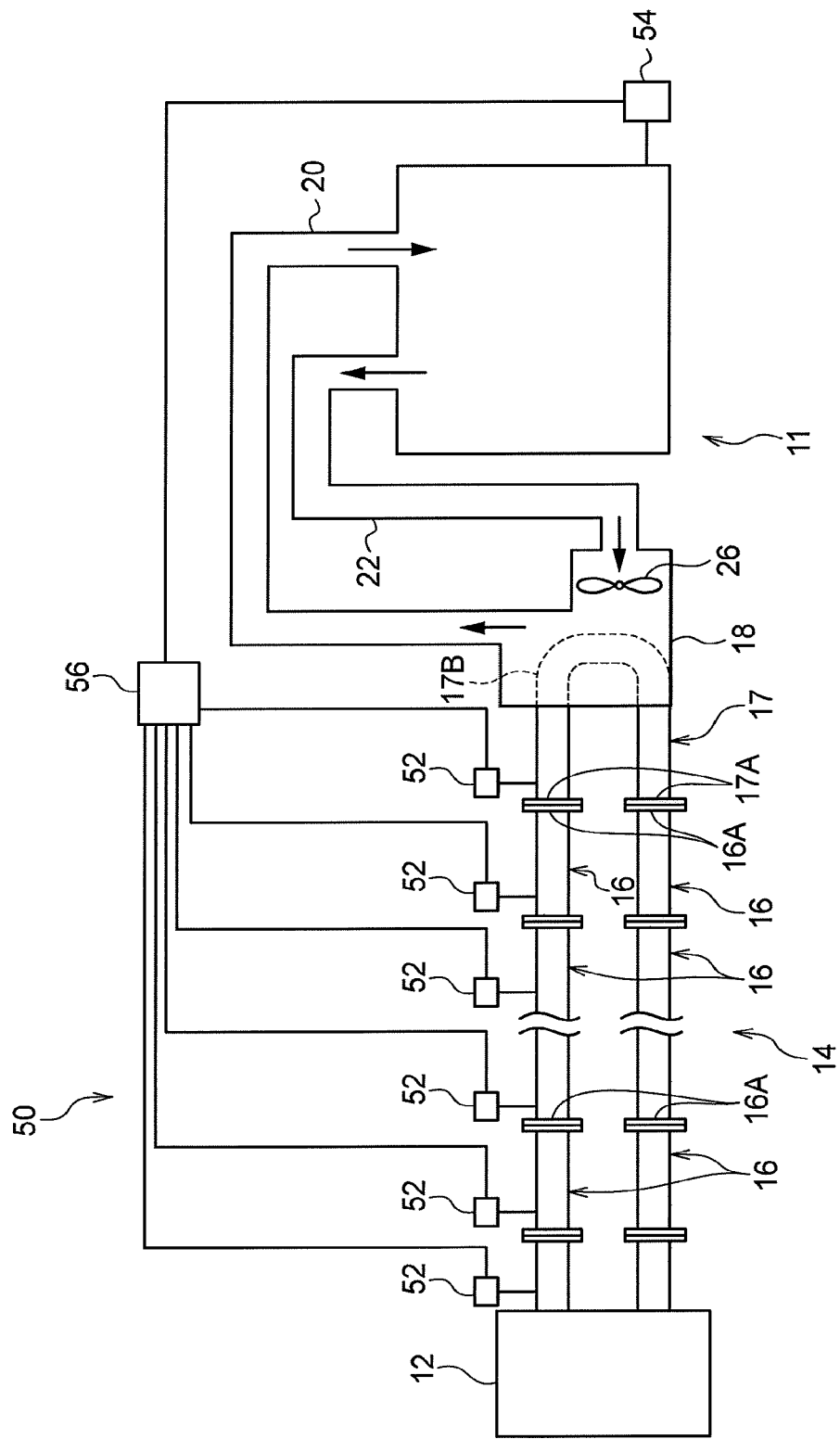
FIG. 4 is a schematic diagram illustrating an overall configuration of a heating and cooling system according to a second exemplary embodiment of the present invention.

As illustrated in FIG. 4, a heating and cooling system 50 according to the present exemplary embodiment is provided with a water thermometer 52 that serves as an internal thermometer for each double pipe 16 that configures the double pipe unit 14, so as to enable the temperature to be measured of cooling water flowing in an inner pipe 28 of the double pipe 16.

Further, a room thermometer 54 is provided in a room 24 of a facility 11, and is configured to measure the temperature of the room 24. Furthermore, the internal thermometer 52 and the room thermometer 54 are electrically connected to a controller 56. Accordingly, the controller 56 can acquire the temperature of the cooling water measured by the internal thermometer 52, and the temperature of the room 24 measured by the room thermometer 54.

Further, the controller 56 is electrically connected to an air inlet valve 32 and a vacuum pump 36 provided in a double pipe 17 (see FIG. 2). Thus, the air inlet valves 32 can be opened or closed by signals from the controller 56. Further, the vacuum pump 36 can be actuated by signals from the controller 56.

The controller 56 controls the air inlet valve 32 or the vacuum pump 36 according to the temperature of at least one out of the temperature of the cooling water measured by the internal thermometer 52, or the temperature of the room 24 measured by the room thermometer 54. Thereby, the controller 56 adjusts the degree of vacuum of a space 38 between the inner pipe 28 and an outer pipe 30 of the double pipe 17.

Note that, in the present exemplary embodiment, all of the double pipes 16 configuring the double pipe unit 14 are provided with an internal thermometer 52. However, the present invention is not limited thereto. For example, a configuration may be adopted in which the internal thermometers 52 are provided to only some of the double pipes 16.

Operation and Advantageous Effects

Next, description follows regarding operation and advantageous effects of a heating and cooling system according to the present exemplary embodiment.

In the heating and cooling system 50 according to the present exemplary embodiment, the temperature of the room 24 may be maintained at a predetermined temperature by the controller 56 controlling the air inlet valve 32 and the vacuum pump 36 according to the temperature of at least one out of the water temperature measured by the internal thermometer 52 or the room temperature measured by the room thermometer 54.

In the above described operation, a case in which the controller 56 controls the air inlet valve 32 and the vacuum pump 36 according to the temperature of the room thermometer 54 will be described as an example. In a case in which the temperature of the room 24 measured by the room thermometer 54 is lower than a pre-set temperature, the controller 56 opens the air inlet valve 32 of some of the double pipes 16 for a predetermined duration. Air is thereby introduced into the space 38 between the inner pipe 28 and the outer pipe 30, and the degree of vacuum of the space 38 is lowered. The thermal insulation effect of some of the double pipes 16 decreases, and the heat exchange with the cooling water before reaching the heat exchange chamber 18 is promoted. As a result, the temperature of the cooling water when it reaches the heat exchange chamber 18 is raised, decreases the cooling performance, and enables the temperature of the room 24 to be raised.

In contrast thereto, in a case in which the temperature of the room 24 measured by the room thermometer 54 is higher than the pre-set temperature, the controller 56 actuates the vacuum pump 36 of some of the double pipes 16 for a predetermined duration. The space 38 between the inner pipe 28 and the outer pipe 30 is thereby evacuated, and the degree of vacuum of the space 38 is raised. The thermal insulation effect of some of the double pipes 16 increases, and the heat exchange with the cooling water before reaching the heat exchange chamber 18 are suppressed. As a result, the temperature of the cooling water when it reaches the heat exchange chamber 18 is lowered, and enables the temperature of the room 24 to be lowered.

Note that the controller 56 controls the air inlet valve 32 and the vacuum pump 36 according to the internal thermometer 52 in a similar manner. Further, although a description has been given in the present exemplary embodiment of a case in which the temperature of the room 24 is maintained at a pre-set temperature, there is no limitation thereto. For example, a similar method may be employed in a case in which it is desired to set the temperature of the room 24 higher than, or is desired to set the temperature of the room 24 lower than, the pre-set temperature.

Further, in the present exemplary embodiment, a method to maintain the temperature of the room 24 at a predetermined temperature has been explained, there is no limitation thereto. For example, the temperature of a heat source, not illustrated in the drawings, disposed between the heating plant 12 and the facility 11 may be measured, and the degree of vacuum of the space 38 in the double pipes 16 may be adjusted such that the temperature of the heat source is a predetermined temperature.

Third Exemplary Embodiment

Next, description follows regarding a third exemplary embodiment of a heating and cooling system according to the present invention. Note that the same reference numerals are appended to similar configuration to that of the first exemplary embodiment, and explanation thereof is omitted if appropriate.

As illustrated in FIG. 6, a heating and cooling system 60 according to the present exemplary embodiment is applied to a server room 62 such as that of a data center. The heating and cooling system 60 includes a heating plant 12, and a double pipe unit 14 configured by coupling together plural double pipes 16.

The double pipe unit 14 is installed either in the floor or in the ceiling in the server room 62. Plural servers 64 are placed in the server room 62, and the double pipe unit 14 is arranged alongside the servers 64.

Plural thermometers 66 are disposed as external thermometers inside the server room 62. As an example, in the present exemplary embodiment, five thermometers 66A, 66B, 66C, 66D, and 66E are disposed. Each of the thermometers 66 is disposed in the surroundings of the double pipe unit 14, and is electrically connected to a controller, not illustrated in the drawings.

An air inlet valve 32 and a vacuum pump 36 are provided to each of the double pipes 16 configuring the double pipe unit 14, and the controller is electrically connected to these air inlet valves 32 and vacuum pumps 36 (see FIG. 2). Thus, the air inlet valves 32 can be opened or closed by signals from the controller 56. Further, the vacuum pump 36 can be actuated by signals from the controller 56.

Thus, the controller is configured such that the degree of vacuum of the space 38 between the inner pipe 28 and the outer pipe 30 of the double pipes 16 can be adjusted for double pipes 16 in given positions (in a heat exchange section) by controlling the air inlet valve 32 or the vacuum pump 36 according to the temperature of the surroundings of the double pipe unit as measured by the thermometers 66.

Operation and Effects

Description follows regarding operation and effects of a heating and cooling system according to the present exemplary embodiment.

In the heating and cooling system 60 according to the present exemplary embodiment, localized cooling can be performed at a given location inside the server room 62 by the controller controlling the air inlet valve 32 and the vacuum pump 36 according to the temperature measured by the thermometers 66.

Description follows regarding the above action for a case in which the controller controls the air inlet valve 32 and the vacuum pump 36 according to the temperature of the thermometers 66. For example, in cases in which the amount of heat emitted from the server 64 disposed in the vicinity of the thermometer 66A increases, and the temperature measured by the thermometer 66A has become greater than a pre-set temperature, the air inlet valve 32 in the double pipe 16 in the vicinity of the thermometer 66A is opened for a predetermined duration by the controller. The degree of vacuum is thereby decreased in this double pipe 16, lowering the thermal insulation effect. As a result, heat exchange with the cooling water is promoted in the vicinity of the thermometer 66A, enabling the temperature at this area to be locally lowered.

Note that, although in the present exemplary embodiment the degree of vacuum is adjusted based on the temperature measured by the thermometers 66, there is no limitation thereto. For example, as in the second exemplary embodiment, water thermometers capable of measuring the temperature of the cooling water flowing in the inner pipe 28 of the double pipe 16 may be provided, in a configuration in which the degree of vacuum is adjusted based on at least one out of the temperature of the cooling water measured by these water thermometers or the room temperature measured by the thermometers 66.

Test Examples

A double pipe 16 having a length of 100 m was employed to investigate the cooling performance of a coolant for a case in which the degree of vacuum in a space between and inner pipe and an outer pipe was changed. The outer pipe employed had an outer diameter of 54 mm and an inner diameter of 48 mm. Further, the inner pipe employed had an outer diameter of 33 mm and an inner diameter of 29 mm. The coolant was liquid nitrogen (at −200° C.).

The cooling performance was 1 W per 1 m length when the degree of vacuum of the space was at $1\times10^{-2}$ PA (a high vacuum). Further, the cooling performance was 30 W per 1 m length when the degree of vacuum of the space was at 10 PA (a medium vacuum). Further, the cooling performance was 150 W per 1 m length when the space was at atmospheric pressure. It was confirmed by the above that the cooling performance of the coolant changes according to the degree of vacuum of the space between the inner pipe and the outer pipe in a double pipe.

Although a description has been given of heating and cooling systems according to the first exemplary embodiment to the third exemplary embodiment of the present invention, appropriate combinations of these exemplary embodiments may be employed, and obviously various modes may be implemented within a scope not departing from the spirit of the present invention. For example, although in the above exemplary embodiments the double pipe unit 14 is configured by coupling together plural double pipes 16, the present invention is not limited thereto. For example, part of the double pipe unit 14 may be configured solely by the inner pipe 28. In such cases, the thermal insulation effect is lower than in a configuration in which the space 38 between the inner pipe 28 and the outer pipe 30 of the double pipes 16 is at atmospheric pressure, enabling heat exchange with the heating medium to be promoted. Further, a configuration may be adopted in which part of the double pipe unit 14 is configured solely by an inner pipe 28 covered with a thermal insulator. Similarly in such cases, the thermal insulation effect can be lowered to less than that of the double pipe 16. Further, the thermal insulation effect can be adjusted by changing the quantity or substance of the thermal insulator. Furthermore, a configuration may be adopted in which double pipes 16 are coupled together by a single pipe. Configuring a portion positioned in the vicinity of a heat exchange section where heat exchange is performed with a single pipe, lowers the thermal insulation effect at this position, enabling heat exchange with the heating medium to be promoted.

Further, although in the above exemplary embodiments plural double pipes 16 are coupled together to form the double pipe unit 14, the present invention is not limited thereto. For example, a configuration may be adopted in which, in FIG. 1, a connection is made from the heating plant 12 to the facility 11 using a single double pipe 16. In such cases, partitioning the space 38 between the inner pipe 28 and the outer pipe outer pipe 30 into plural zones, and setting the degree of vacuum to be different in each respective zone enables similar advantageous effects to be obtained to those of the above exemplary embodiments. However, from the perspective of increasing the degrees of freedom of design, and from the perspective of improving maintainability, preferably plural double pipe 16 are coupled together to form the double pipe unit 14.

Further, although in the above exemplary embodiments the cooling water is circulated between the heating plant 12 and the facility 11, the present invention is not limited thereto. For example, the cooling water that has passed through the heat exchange chamber 18 may be expelled and not returned to the heating plant 12. Further, in cases in which liquid nitrogen is employed as the heating medium, the liquid nitrogen may be released into the atmosphere as nitrogen gas after being passed through the heat exchange chamber 18.

Further, although in the above exemplary embodiments there is only a single cooling target, the present invention is not limited thereto. For example, a configuration may be adopted in which the double pipe 16 is branched and connected to plural cooling targets or to plural heating targets.

Further, although in the above exemplary embodiments the double pipe unit 14 is connected between the heating plant 12 and the facility 11, the present invention is not limited thereto. For example, the double pipe unit 14 may be installed in an underground tunnel (trough) where power cable or the like are installed. In such cases, effective cooling can be performed inside the tunnel by setting the degree of vacuum of the space 38 between the inner pipe 28 and the outer pipe 30 in the double pipe 16 disposed at a place where the temperature inside the tunnel is high to a lower degree of vacuum than the degree of vacuum of the space 38 between the inner pipe 28 and the outer pipe 30 in the other double pipes 16.

What is claimed is:

1. A heating and cooling system, comprising:
   a heat plant configured to supply a heating medium; and
   a plurality of double pipes includes a plurality of inner pipers and a plurality of outer pipes in which a plurality of spaces between each of plurality of inner pipes and a corresponding outer pipe of the plurality of outer pipes disposed at an outer peripheral side of a corresponding inner pipe of the plurality of inner pipes is sealed, the plurality of spaces being maintained at a vacuum, wherein
   one of the plurality of inner pipes is connected to the heat plant and the heating medium flows through the one of the plurality of inner pipes, and
   a degree of vacuum of one of the plurality of spaces in one of the plurality of double pipes, which is positioned at a heat exchange chamber where heat exchange is performed, is lower than a degree of vacuum of each of other spaces of the plurality of spaces in other double pipes of the plurality of double pipes.

2. The heating and cooling system of claim 1, wherein: the plurality of inner pipes and the plurality of outer pipes are coupled together in an axial direction, each of the plurality of outer pipes being shorter than each of the corresponding inner pipe of the plurality of inner pipes in the axial direction, the plurality of spaces between adjacent outer pipes being partitioned.

3. The heating and cooling system of claim 1, wherein a degree of vacuum of each of the plurality of spaces is maintained at a degree of vacuum of a low vacuum, a medium vacuum, or a high vacuum.

4. The heating and cooling system of claim 1, wherein a degree of vacuum of each of the plurality of spaces is adjustable by using at least one of an air inlet valve or a vacuum pump.

5. The heating and cooling system of claim 4, further comprising:
   an internal thermometer that measures a temperature of the heating medium; and
   a controller electrically connected to the internal thermometer, wherein the controller adjusts the degree of vacuum of each of the plurality of spaces by controlling the air inlet valve or the vacuum pump according to the temperature of the heating medium measured by the internal thermometer.

6. The heating and cooling system of claim 4, further comprising:
an external thermometer that measures a temperature of surroundings of the plurality of double pipes; and
a controller electrically connected to the external thermometer,
wherein the controller adjusts the degree of vacuum of each of the plurality of spaces by controlling the air inlet valve or the vacuum pump according to the temperature of the surroundings of the plurality of double pipes measured by the external thermometer.

7. The heating and cooling system of claim 1, wherein a portion of the plurality of double pipes at a position of the heat exchange chamber is configured only by one of the plurality of inner pipes.

8. The heating and cooling system of claim 1, wherein a portion of the plurality of double pipes at a position of the heat exchange chamber is configured only by one of the plurality of inner pipes covered by a thermal insulator.

9. The heating and cooling system of claim 1, further comprising:
a single pipe that couples adjacent double pipes together,
wherein the single pipe is positioned at a vicinity of the heat exchange chamber.

* * * * *